US009492939B2

(12) United States Patent
Yanagi et al.

(10) Patent No.: US 9,492,939 B2
(45) Date of Patent: Nov. 15, 2016

(54) CUTTING APPARATUS FOR SEPARATOR OF ELECTRICAL DEVICE

(71) Applicant: NISSAN MOTOR CO., LTD., Yokohama-shi, Kanagawa (JP)

(72) Inventors: Takahiro Yanagi, Sagamihara (JP); Hiroshi Yuhara, Yokohama (JP)

(73) Assignee: Nissan Motor Co., Ltd., Yokohama-Shi, Kanagawa (JP)

( * ) Notice: Subject to any disclaimer, the term of this patent is extended or adjusted under 35 U.S.C. 154(b) by 0 days.

(21) Appl. No.: 14/647,042

(22) PCT Filed: Nov. 26, 2013

(86) PCT No.: PCT/JP2013/081791
§ 371 (c)(1),
(2) Date: May 22, 2015

(87) PCT Pub. No.: WO2014/087885
PCT Pub. Date: Jun. 12, 2014

(65) Prior Publication Data
US 2015/0298338 A1    Oct. 22, 2015

(30) Foreign Application Priority Data

Dec. 5, 2012  (JP) ................................ 2012-266498

(51) Int. Cl.
*B62D 7/18* (2006.01)
*B26D 7/18* (2006.01)
(Continued)

(52) U.S. Cl.
CPC ............... *B26D 7/1863* (2013.01); *B26D 1/08* (2013.01); *B26D 1/095* (2013.01); *B26D 3/00* (2013.01); *B26D 7/18* (2013.01); *B26D 7/1845* (2013.01); *H01M 2/145* (2013.01);
(Continued)

(58) Field of Classification Search
CPC ...... B62D 7/1863; B62D 1/08; B62D 1/085; B62D 1/09; B62D 1/095; Y10T 83/207
See application file for complete search history.

(56) References Cited

U.S. PATENT DOCUMENTS 3,272,651 A * 9/1966 Quirk ........................ B08B 5/04
134/15
3,765,990 A * 10/1973 Histed ..................... B29C 65/18
156/251

(Continued)

FOREIGN PATENT DOCUMENTS

JP    2001283896 A    10/2001
JP    2011159434 A    8/2011
(Continued)

*Primary Examiner* — Jason Daniel Prone
*Assistant Examiner* — Richard Crosby, Jr.
(74) *Attorney, Agent, or Firm* — Young Basile Hanlon & MacFarlane, P.C.

(57) ABSTRACT

A cutting apparatus for a separator of an electrical device cuts or severs a separator which includes a melt material representing a substrate and a heat-resistant material laminated on the melt material and having a higher melt temperature than the melt material. The separator cutting apparatus comprises at least two cutting members which are disposed spaced apart from one another, a first suction member, and second suction members. The cutting members cut the separator such that a cut piece generates. The first suction member moves the cut piece in a direction away from the separator while sucking the cut piece. The second suction members suck up the cutting dust produced accompanying the cutting process of the separator.

4 Claims, 11 Drawing Sheets

(51) Int. Cl.
  *B26D 1/08*       (2006.01)
  *B26D 3/00*       (2006.01)
  *H01M 2/16*       (2006.01)
  *B26D 1/09*       (2006.01)
  *H01M 2/14*       (2006.01)
  *H01M 10/04*      (2006.01)
  *H01M 10/0525*    (2010.01)

(52) U.S. Cl.
  CPC .......... *H01M 2/1686* (2013.01); *H01M 10/04* (2013.01); *H01M 10/0525* (2013.01)

(56) References Cited

U.S. PATENT DOCUMENTS

| | | | | |
|---|---|---|---|---|
| 3,892,153 | A * | 7/1975 | Kato | B23D 36/0016 83/100 |
| 4,333,369 | A * | 6/1982 | McCort | B26D 7/1863 134/15 |
| 4,581,965 | A * | 4/1986 | Gerber | B26D 7/1854 15/1.51 |
| 4,596,171 | A * | 6/1986 | Gerber | B26D 7/086 408/22 |
| 5,072,638 | A * | 12/1991 | Huser | B26D 7/1854 29/DIG. 78 |
| 5,140,880 | A * | 8/1992 | Littleton | B26D 7/1863 83/100 |
| 5,429,460 | A * | 7/1995 | Campian | B23C 3/00 408/67 |
| 5,787,777 | A * | 8/1998 | Ballestrazzi | B26D 1/095 83/100 |
| 6,895,845 | B2 * | 5/2005 | Snyder | B26D 7/1854 83/100 |
| 7,591,615 | B2 * | 9/2009 | Li | B26D 7/018 408/207 |
| 7,631,673 | B2 * | 12/2009 | Salovaara | B26D 1/095 144/162.1 |
| 7,798,039 | B2 * | 9/2010 | Schurch | B26D 1/385 83/13 |
| 2007/0214925 | A1 * | 9/2007 | Nishio | B28D 1/226 83/401 |
| 2010/0126320 | A1 * | 5/2010 | Macomber | B26D 7/1863 83/24 |
| 2012/0180613 | A1 * | 7/2012 | Lozano | B21F 11/00 83/623 |
| 2013/0087029 | A1 * | 4/2013 | Iyatani | B26D 1/245 83/13 |

FOREIGN PATENT DOCUMENTS

| | | |
|---|---|---|
| JP | 2013179035 A | 9/2013 |
| WO | 2012137904 A1 | 10/2012 |
| WO | 2012137922 A1 | 10/2012 |

* cited by examiner

CUTTING APPARATUS FOR SEPARATOR OF ELECTRICAL DEVICE

CROSS REFERENCE TO RELATED APPLICATION

The present application claims priority to Japanese Patent Application No. 2012-266498, filed Dec. 5, 2012, incorporated herein in its entirety.

TECHNICAL FIELD

The present invention relates to a cutting apparatus for a separator of an electrical device and to a cutting method thereof.

BACKGROUND

Conventionally, in an electrical device such as a secondary battery, a power generating element for performing charging and discharging operations is sealed in an outer or exterior package. The power generating element is formed by stacking a separator and electrodes. The separator easily shrinks when heated. When the separator shrinks, electrical short circuit occurs locally. This would reduce the output of the electrical device.

Thus, by using, as a counter measure, a separator which is formed by laminating on a substrate melt material a heat-resistant material having a melting point higher than the melting point of the melt material, the separator is prevented from shrinkage or contracting even if the separator is heated.

Incidentally, there is a technique in which, after joining an electrode and a separator, the separator is cut with predetermined intervals, cut piece produced at that time is peeled off by an adhesive tape, and adhesive remaining on an exposed cutting surface is subsequently removed to thereby join a current collector tab (see Japanese Patent Application Publication No. 2001-283896A, for example).

However, in Japanese Patent Application Publication No. 2001-283896A, no specific consideration is given to the case of cutting such a separator which is formed by laminating on a melt or fused material representing a substrate a heat-resistant material which is easily scraped. More specifically, even when cut piece generated when cutting the separator can be removed, there is a possibility that cutting dust cannot be removed sufficiently.

SUMMARY

The present invention has been made to solve the problem described above, and is intended to provide a cutting apparatus and a cutting method of a separator, which may remove sufficiently the cutting dust in addition to a cut piece of the cut-out separator.

A cutting apparatus for a separator of an electrical device to solve the problem above relates to a separator cutting apparatus for cutting a separator that includes a melt material representing a substrate and a heat-resistant material laminated on the melt material and higher in melting point than the melt material. The cutting apparatus of a separator of an electrical device comprises at least two cutting members disposed spaced apart from each other, a first suction section, and a second suction section. The cutting member is configured to cut the separator with cut piece being produced. The first suction section sucks the cut piece to move in a direction separating from the separator. The second suction section sucks cutting dust generated due to cutting process of the separator.

Further, a cutting method for a separator of an electrical device to solve the problem above relates to a separator cutting method for cutting a separator that includes a melt material representing a substrate and a heat-resistant material laminated on the melt material and higher in melting point than the melt material. According to the cutting method of a separator of an electrical device, a separator is cut with at least two cutting members disposed spaced apart from each other, with cut piece being generated. The cut piece is sucked by a first suction section which is configured to move the cut piece in a direction separating from the separator while sucking the same. The second suction section sucks cutting dust generated due to cutting process of the separator.

DETAILED DESCRIPTION OF THE EMBODIMENTS

Figure 1:
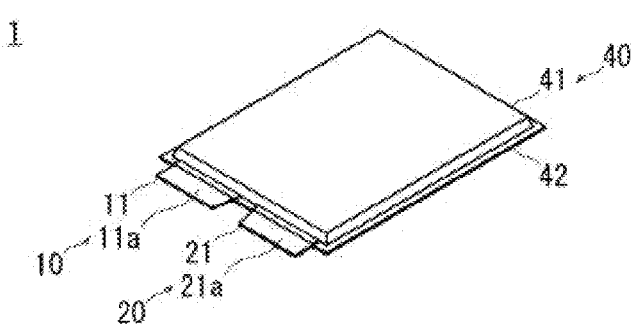
FIG. 1 is a perspective view showing an electrical device in which separators are joined in the separator welding apparatus comprising a cutting apparatus pertaining to a first embodiment.

Below, with reference to accompanying drawings, description is given of an embodiment of the present invention. The same reference numerals are given to the same elements, and duplicate description will be omitted in the description of the drawings. The proportion and size of each member in the drawings may be different from the proportion and the size of the actual one, and exaggerated for convenience of explanation.

First Embodiment

First, description is given of a structure of an electrical device 1 in which separators 30 are cut by a separator welding apparatus 100 with a separator cutting apparatus 700, 800 pertaining to a first embodiment, and are subsequently welded or joined, with reference to FIGS. 1 to 4.

Figure 2:
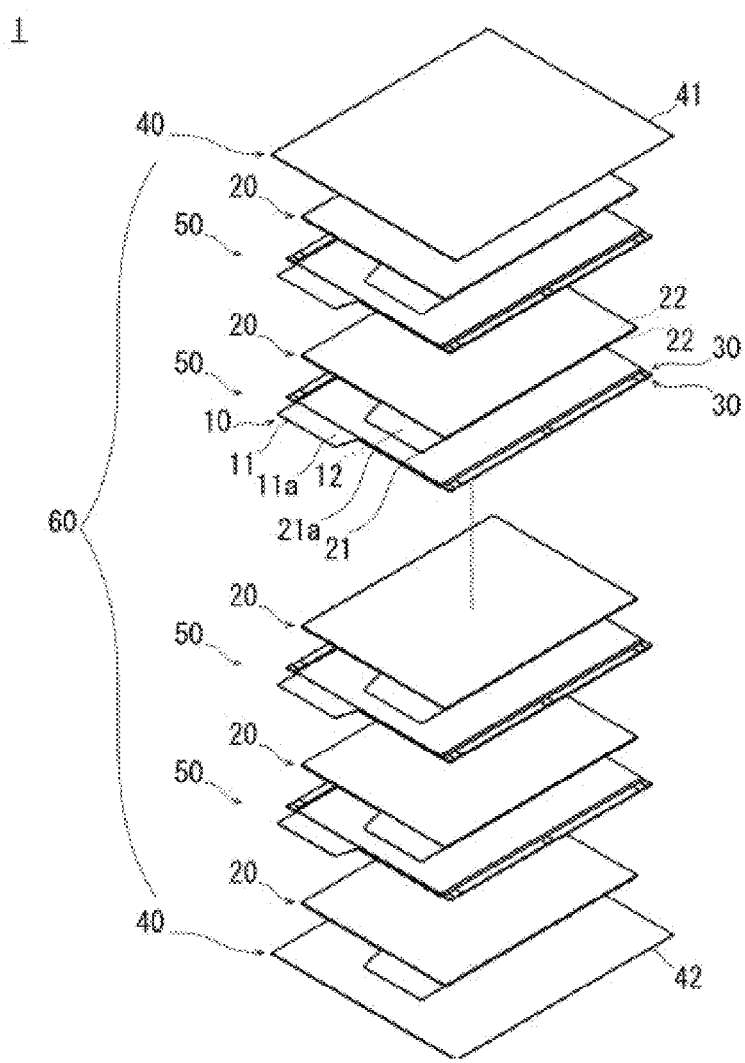
FIG. 2 is an exploded perspective view showing an electrical device in which separators are joined by separator welding apparatus comprising a separator cutting apparatus pertaining to the first embodiment.
Figure 3:
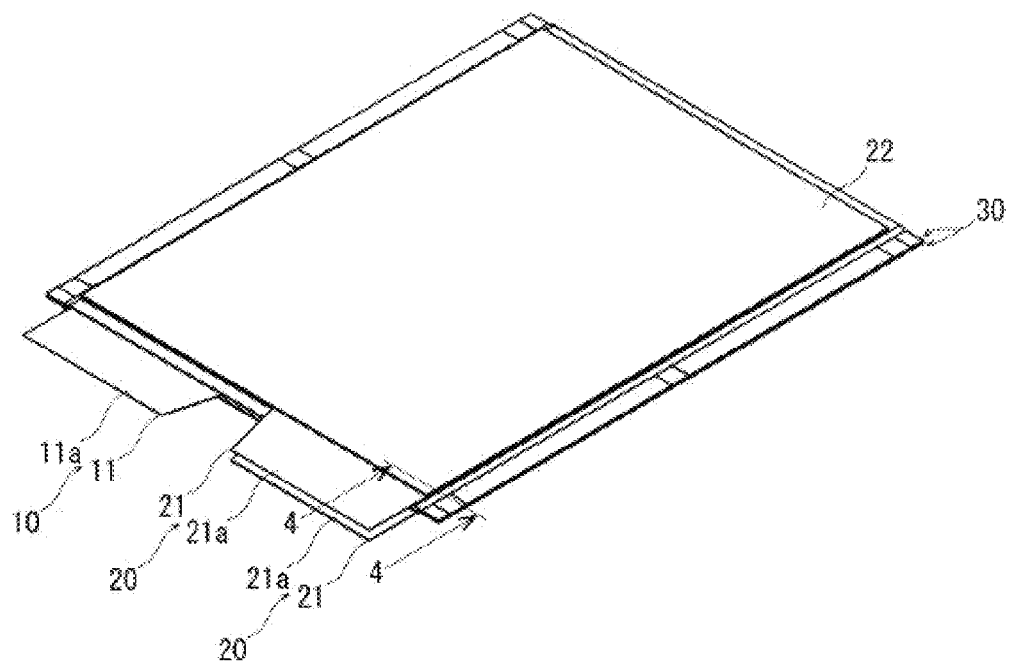
FIG. 3 is a perspective view showing a state in which, by the welding apparatus comprising a separator cutting apparatus pertaining to the first embodiment, a positive electrode is enclosed in a bag or pouch by a pair of separators to form a pouch electrode on both ends thereof being laminated with a negative electrode, respectively.
Figure 4:
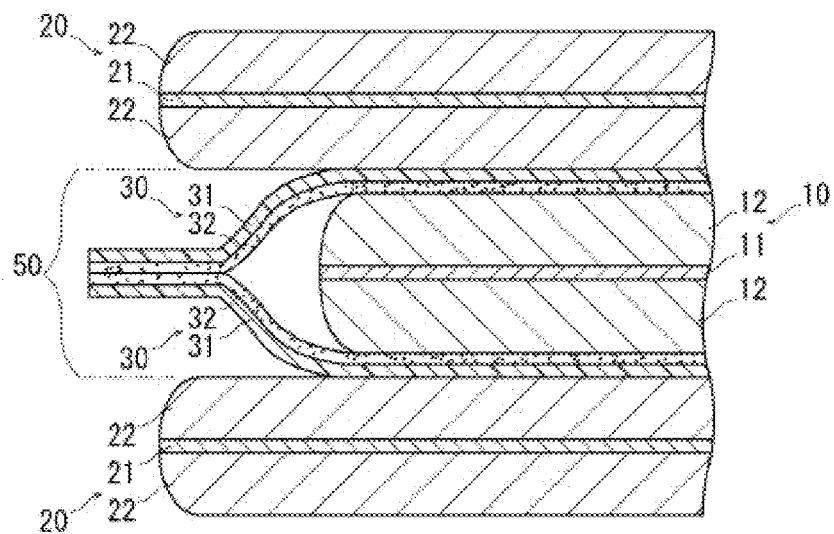
FIG. 4 is a sectional view pertaining to the first embodiment taken along line 4-4 of FIG. 3.

FIG. 1 is a perspective view showing an electrical device 1 in which separators are joined by the separator welding apparatus 100 comprising a separator cutting apparatus 700, 800; FIG. 2 is an exploded perspective view showing an electrical device 1 in which separators are joined by the separator welding apparatus 100 comprising a separator cutting apparatus 700, 800; and FIG. 3 is a perspective view showing a state in which, by the welding apparatus 100 comprising a separator cutting apparatus 700, 800, in which a positive electrode 10 is enclosed in a bag or a pouch by a pair of separators 30 to form a pouched electrode 50 with, on both ends thereof, being laminated with a negative electrode 20, respectively; and FIG. 4 is a sectional view taken along line 4-4 shown FIG. 3.

As shown in FIG. 1, for example, the electrical device 1 represents a lithium ion secondary battery, a lithium polymer battery, a nickel hydrogen battery, a nickel cadmium battery. A shown in FIG. 2, in the electrical device 1, the power generating element 60 for charge/discharge is sealed with an outer or exterior material 40. The power generating element 60 is configured by alternately laminating a pouched electrode 50 sandwiching a positive electrode 10 by a pair of separators 30 for welding and a negative electrode 20.

The positive electrode 10 represents a first electrode, and is formed by bonding on both surfaces of a conductive, positive electrode collector 11 positive active materials 12, as shown in FIG. 2. A positive electrode terminal 11a for taking out the power is formed by extending a part of one end of the positive electrode collector 11. A plurality of positive electrode terminals 11a of the plurality of laminated positive electrodes 10 are fixed together by welding or adhesive.

The material of the positive electrode current collector 11 of the positive electrode 10, for example, is made of aluminum expanded metal, or aluminum mesh or aluminum punched metal. When the electrical device 1 is a lithium ion secondary battery, the material of the positive electrode active material 12 of the positive electrode 10 is composes of various oxides (lithium manganese oxide, such as LiMn2O4; manganese dioxide; lithium nickel oxides such as LiNiO2; lithium cobalt oxide such as LiCoO2; lithium-containing nickel-cobalt oxide; amorphous pentoxide vanadium containing lithium) or chalcogen compound (titanium disulfide, molybdenum disulfide).

A negative electrode 20 corresponds to a second electrode of different polarity to the first electrode (positive electrode 10), and as shown in FIG. 2, is formed by bonding negative active material 22 on both surfaces of a negative electrode current collector 21 which is conductive. A negative electrode terminal 21a is formed by extending from a part of one end of the negative electrode collector 21 so as not overlap the positive electrode terminal 11a formed in the positive electrode 10. The longitudinal length of the negative electrode 20 is longer than the longitudinal length of the positive electrode 10. In the lateral length of the negative electrode 20 is of the same as that of the positive electrode 10. A plurality of negative electrode terminals 21a of the negative electrodes 20 stacked are secured together by adhesive or welding.

The material of the negative electrode current collector 21 of the negative electrode 20, for example, is made from a copper expanded metal, copper mesh, or copper punched metal. As the material of the negative electrode active material 22 of the negative electrode 20, when the electrical device 1 is a lithium ion secondary battery, and use is made of a carbon material that adsorbs and releases lithium ion. As such carbon material, for example, natural graphite, artificial graphite, carbon black, activated carbon, carbon fiber, coke, or organic precursor (phenolic resin, polyacrylonitrile, or cellulose) is heat-treated in an inert atmosphere and synthetic carbon is used.

As shown in FIG. 2, the separator 30 is provided between the positive and negative electrodes 10, 20 to electrically isolate the positive electrode 10 and the negative electrode 20 from each other. By holding an electrolyte solution between the positive electrode 10 and the negative electrode 20, the separator 30 ensures conductivity of the ion. The separator 30 is formed in a rectangular shape. The longitudinal length of the separator 30 is longer than the longitudinal length of the negative electrode 20 except the portion of the negative electrode terminal 21a.

A pair of adjacent separators 30 is bonded with the associated melt material 32 faced to each other. Thus, for example, even when the heat-resistant material 32 is powder which may easily scatter after being applied to the melt material 31 and subsequently dried, the powder may be confined and sealed in the interior of the pair of the adjacent separators 30. That is, even if the electrical device 1 receives shock or vibrations, it is possible to prevent scattering of the heat-resistant material 32 of the separator 30.

As the material of the melt material 31 of the separator 30, for example, use is made of a polypropylene. The molten material 31 is impregnated with a non-aqueous electrolyte solution prepared by dissolving an electrolyte in a non-aqueous solvent In order to retain the non-aqueous electrolytic solution, use is made to contain a polymer.

As a material of the heat-resistant material 32 of the separator 30, for example, use is made of a ceramic molded with high temperature inorganic compounds. The ceramic is formed to be porous by binding ceramic particles of silica, alumina, zirconium oxide, titanium oxide with a binder. The material of the heat-resistant material 32 is not limited to ceramic. The alternative is acceptable as long as the melting temperature thereof may be higher than the melting member 31. The ceramic particles correspond to the powder, in which the binding effect may be different and the peel strength is thereby affected depending on density and coupling condition of the binder, for example.

As shown in FIG. 2, the outer or exterior package 40 may be consisted, for example, of laminate sheets 41, 42 with a metal plate inside and is sealed by covering both sides of the power generating element 60. When sealing the power generating element 60 with the laminate sheets 41, 42, a portion of the periphery of the laminate sheet 41 and 42 is made open, and the other periphery will be sealed by heat welding or the like. An electrolyte is injected from the portion that is open and the separator 30 or the like is impregnated with a liquid charge. While depressurizing the interior from the open portion of the laminate sheets 41, 42 to remove air, the open portion will also be heat-sealed to seal completely.

As the material for the laminate sheets 41, 42, for example, use is made of three different, laminated materials. Specifically, for the material of the heat-fusible resin of the first layer adjacent to the negative electrode 20, use is made from, for example, polyethylene (PE), ionomer, or ethylene vinyl acetate (EVA). As the metal foil of the second layer, for example, use is made of an Al foil or Ni foil. As the resin film of the third layer, for example, use is made of polyethylene terephthalate (PET) or nylon with rigidity.

Now, description is given of a cutting method of a separator 30 of an electrical device 1, of a separator cutting apparatus 700, 800 embodying the cutting method, and of the separator welding apparatus 100, provided with the separator cutting apparatus 700,800, for welding conveyed separators 30 together, FIGS. 5 to 10.

Figure 5:
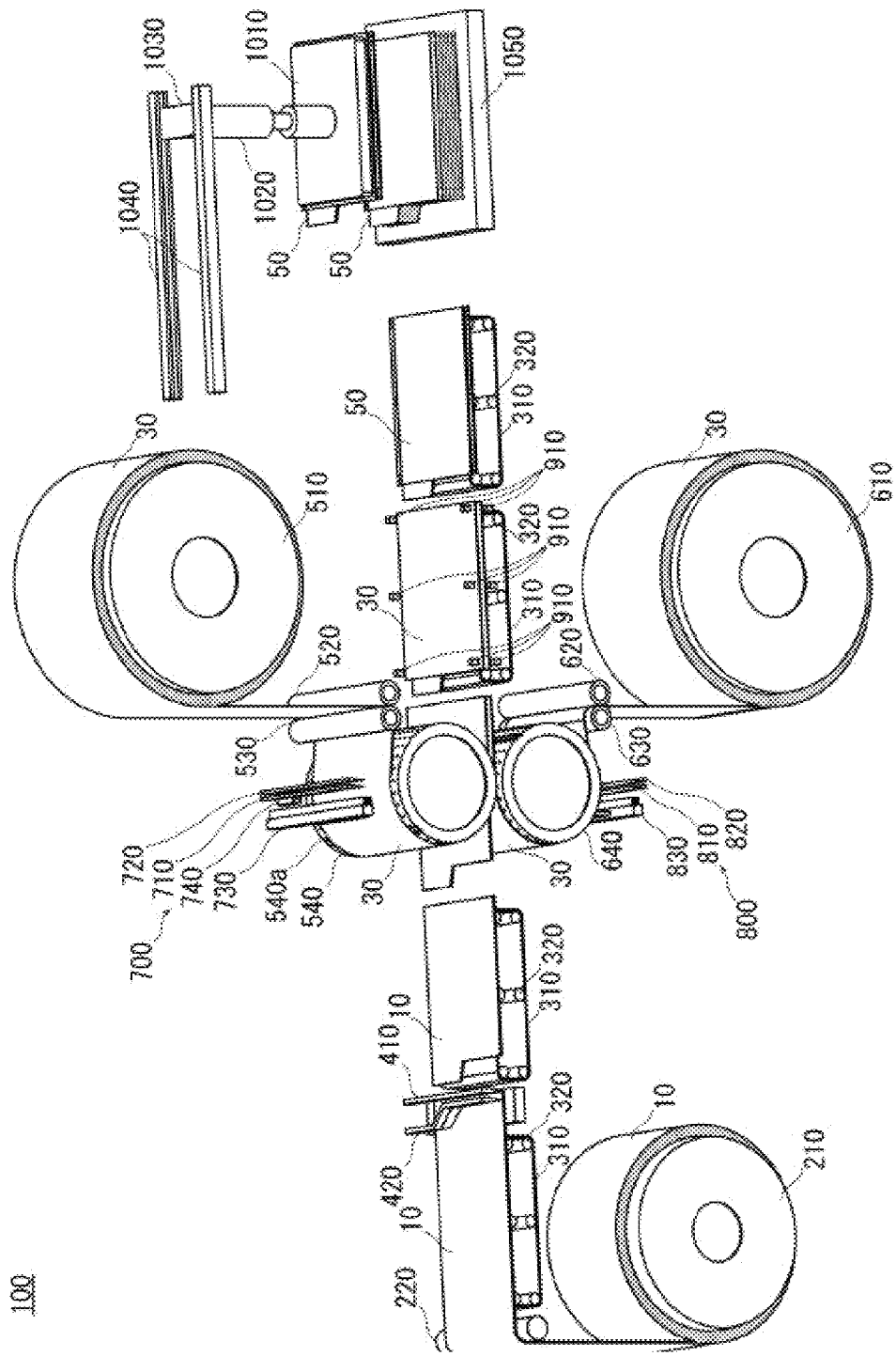
FIG. 5 is a perspective view showing a separator cutting apparatus provided with a separator conveying apparatus pertaining to the first embodiment for joining the separator of the electrical device.
Figure 6:
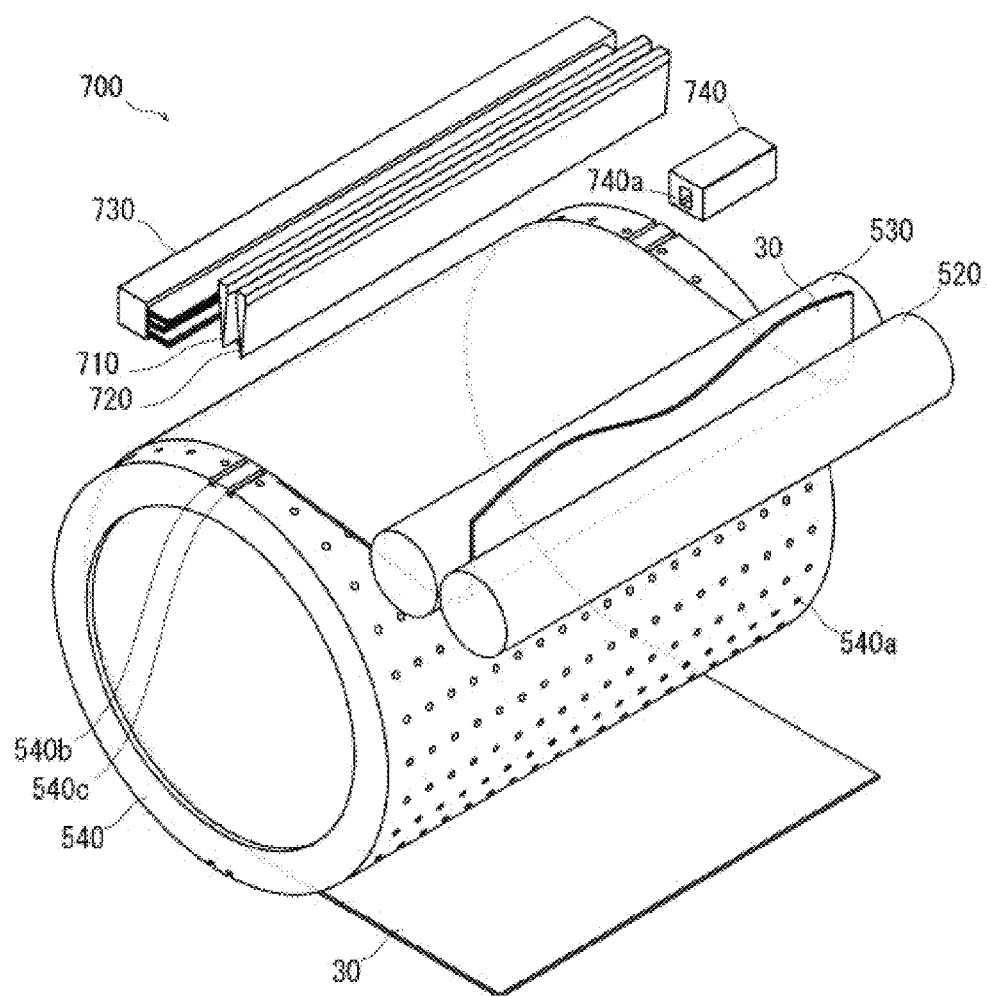
FIG. 6 is a perspective view showing the vicinity of the separator cutting apparatus pertaining to the first embodiment before cutting a separator.
Figure 7:
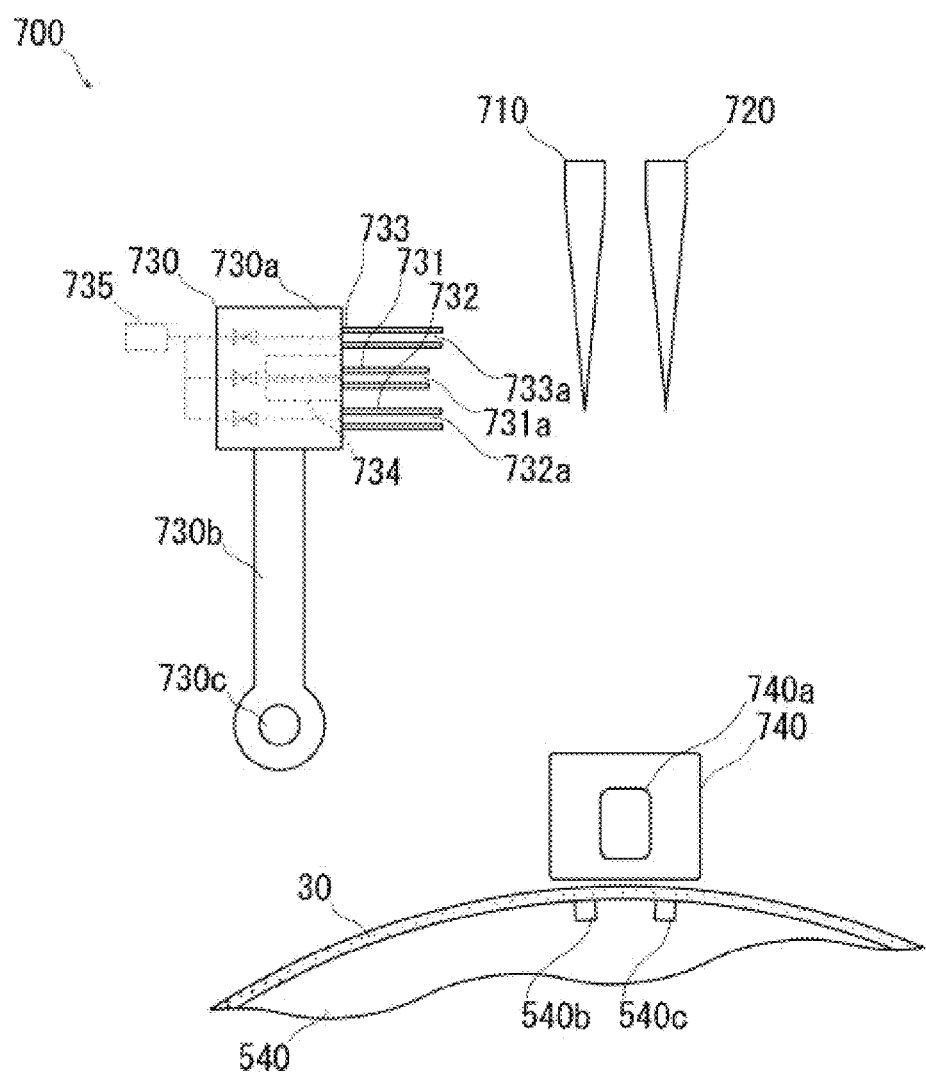
FIG. 7 is a side view showing the vicinity of the separator cutting apparatus pertaining to the first embodiment.
Figure 8:
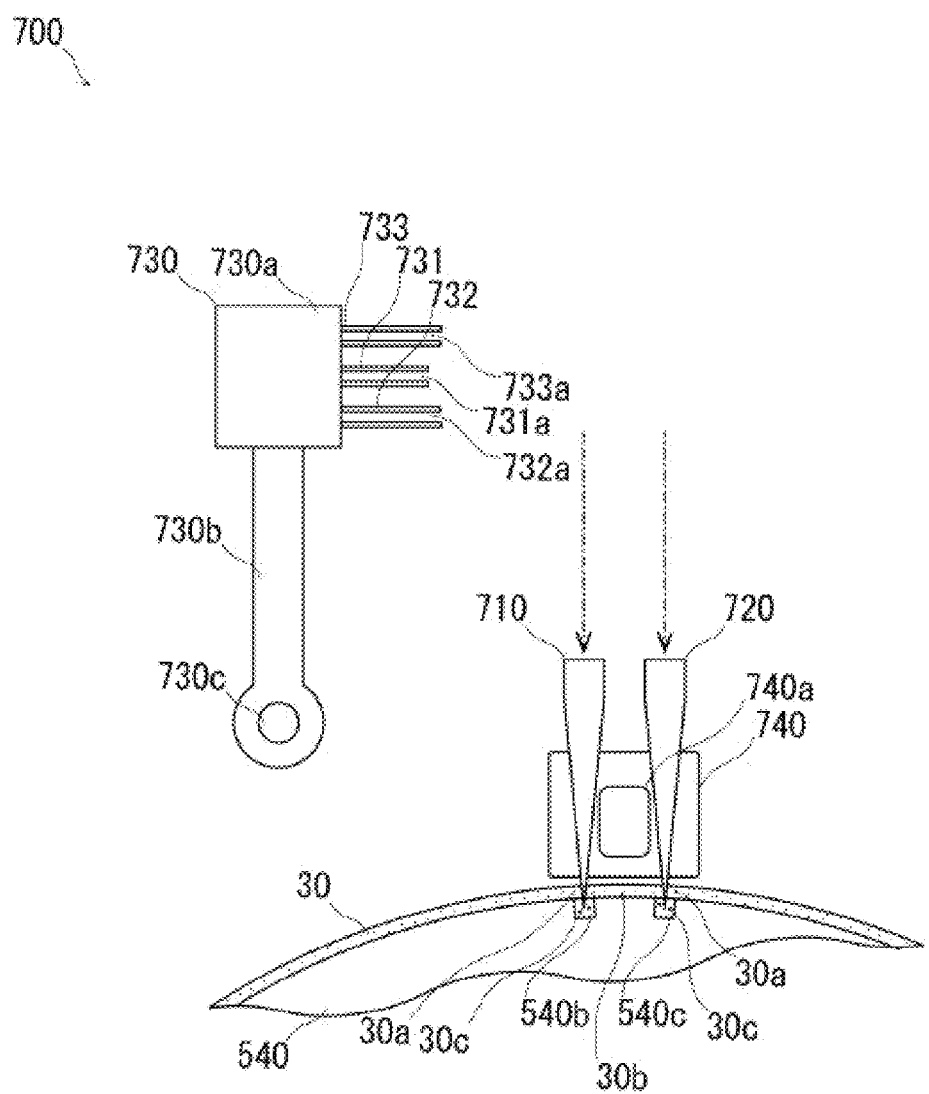
FIG. 8 is a side view showing the vicinity of a separator cutting apparatus 700 in a state in which a separator is cut with a cutting member included in the separator cutting apparatus.
Figure 9:
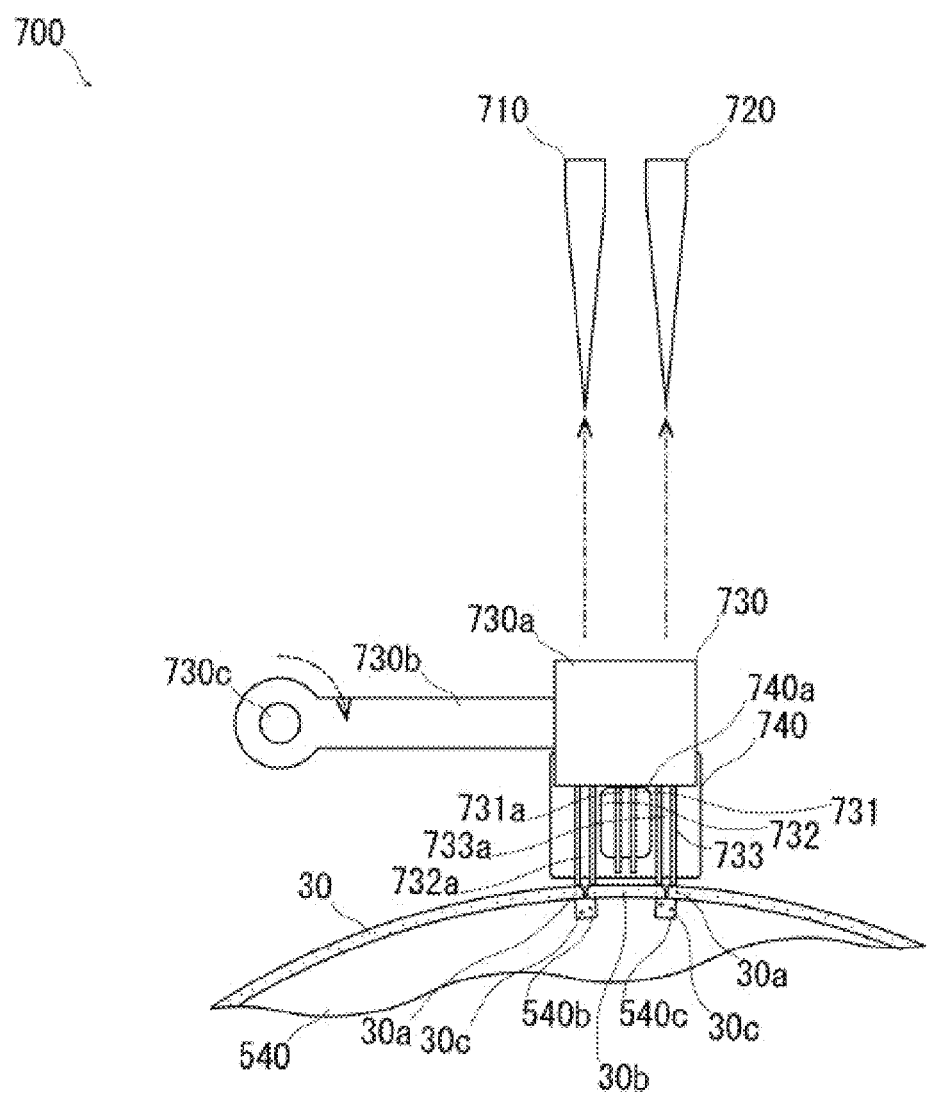
FIG. 9 is a side view showing the vicinity of the separator cutting apparatus pertaining to the first embodiment with a suction member device kept in contact to the cut portion of the separator after the cutting member has been retracted from the separator.
Figure 10:
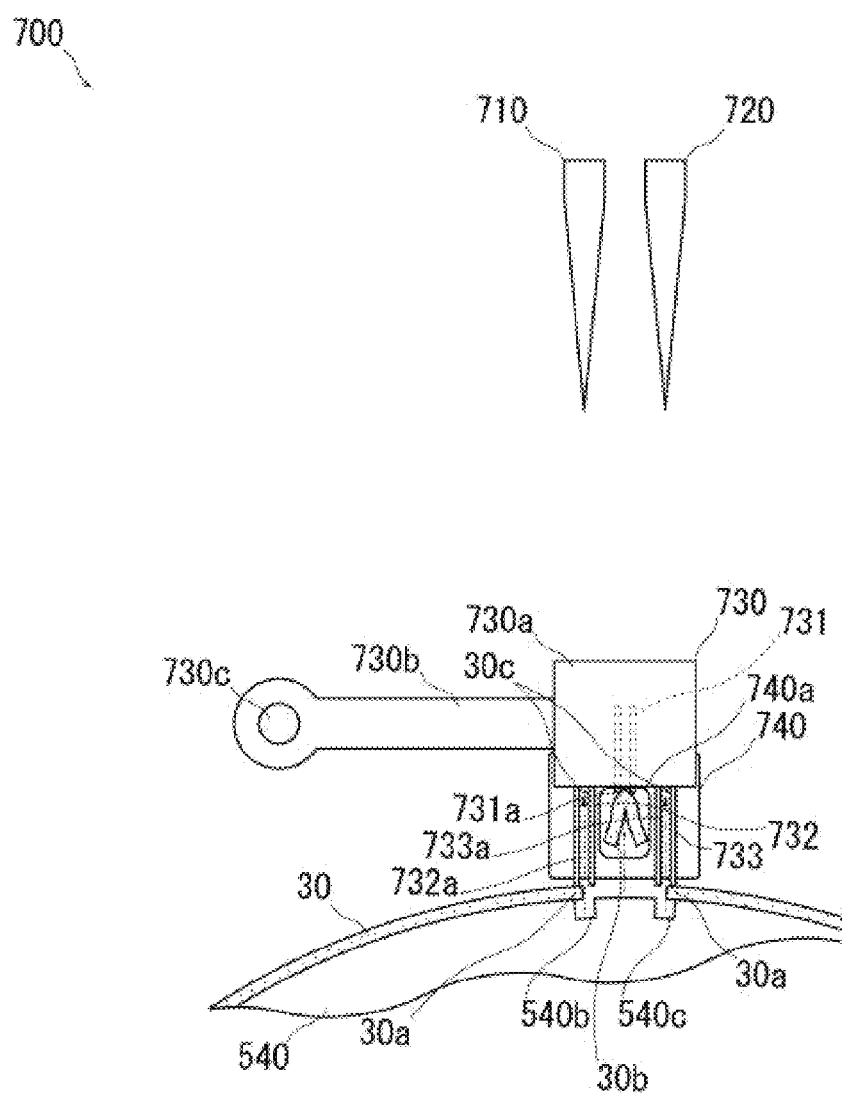
FIG. 10 is a side view showing the vicinity of the separator cutting apparatus pertaining to the first embodiment in a state in which the cut piece of the separator and the cutting dust are sucked by using the suction member.

FIG. 5 is a perspective view showing a separator welding apparatus for joining the separators 30 of an electrical device, provided with a separator cutting apparatus 700, 800; FIG. 6 is a perspective view showing the vicinity of the separator cutting apparatus 700 in a state before cutting a separator 30; FIG. 7 is a side view showing the vicinity of the separator cutting apparatus 700 in a state before cutting a separator 30; FIG. 8 is a side view showing the vicinity of a separator cutting apparatus 700 in a state in which a separator 30 is cut with a cutting member 710, 720 included in the separator cutting apparatus 700; FIG. 9 is a side view showing the vicinity of the separator cutting apparatus 700 with a suction member device kept in contact to the cut portion of the separator in a state after the cutting member 710, 720 has been retracted from the separator 30; and FIG. 10 is a side view showing the vicinity of the separator cutting apparatus 700 in a state in which the cut piece 30b of the separator 30 and the cutting dust 30c are sucked by using the suction member 730.

Here, it is equally acceptable to join separators 30 together while conveying by pressurizing the separators 30 together by a heating press member 710 while heating, and to insert thereafter a positive electrode between a pair of the separators 30. However, in view of productivity and quality, description is given with respect to such a configuration in which the positive electrode sandwiched by the separators 30 are joined together by heating press member 710 under heat and pressure while being conveyed.

As shown in FIG. 5, in the separator welding apparatus 100, the positive electrode 10 is held by being wound into a roll around a positive electrode winding roller 210. The positive electrode winding roller 210 is formed in a cylindrical shape and rotates in a clockwise direction following the rotation of the suction conveyor 310. The positive electrode 10 is carried out from the positive electrode winding roller 210 conveyed in the direction of 640 toward a vacuum suction conveyance drum 540 described below through a conveyance roller 220.

The suction conveyer 310 consists of an endless belt and provided with a plurality of suction holes on the surface. On the inner circumferential surface of the suction conveyor 310, a plurality of rotating rollers 320 is arranged. One of a plurality of the rotating rollers 20 is intended for a driving roller, and the others are driven rollers. The suction conveyors 310 caused to be rotated in a clockwise direction by the plurality of rotating rollers 320 are provided in two sets respectively on the conveyance downstream side and the conveyance upstream side of the positive electrode with respect to the vacuum suction conveyance drums 540, 640.

The cutting members 410, 420 for cutting out the positive electrode 10 are disposed between two sets of suction conveyors 310 disposed upstream in the conveyance direction of the positive electrode 10 with respect to the vacuum suction conveyance drum 540, 640. The cutting member 410 is provided at the tip with a sharp and straight cutting blade and cuts one end of the positive electrode 10 that is continuous. The cutting member 420 is provided with a sharp and bent cutting blade at the tip, and cuts the other end of the positive electrode 10 immediately after being cut at that one end. The shape of the bent cutting blade of the cutting member 420 corresponds to the shape of the positive electrode terminal 11a.

One separator 30 of the pair of separators 30 is held in a roll and wound around the separator winding roller 510. A melt or fused material 31 of the one separator 30 is in contact with a side of axis of the separator winding roller 510. The separator winding roller 510 is formed in a cylindrical shape and allowed to rotate in counterclockwise direction following the rotation of the vacuum suction conveyance drum 540 representing the conveying apparatus. The one separator 30 is conveyed with a constant tension posed and sandwiched between the pressure roller 520 and the nip roller 530, and is further caused to rotate in a counterclockwise in a state of being vacuum sucked around the vacuum suction conveyance drum 540. The vacuum suction conveyance drum 540 is formed in a cylindrical shape with a plurality of suction ports.

As detailed in FIGS. 6 and 7, the separator cutting apparatus 700 is intended to cut one of the pair of the separators 30. The cutting members 10, 720 are disposed parallel with respect to the vacuum suction conveyance drum 540. The cutting member 710, 720 of the cutting section is driven in the direction approaching the vacuum suction conveyance drum 540 as well as in the direction away from the vacuum suction conveyance drum 540. The cutting member 710,720 is made of metal and formed at the tip thereof with a sharp edge. The cutting member 710, 720 extends perpendicular to the conveying direction of the separators 30.

As shown in FIG. 8, the cutting members 710, 720 of the cutting section, disposed spaced apart from each other are urged to or pressed against the separator 30 to cut the separator 30. Accompanied by the cutting process of the separator 30, in a region sandwiched between the cutting members 710, 720, a cut piece is generated. A surface area of the vacuum suction conveyance drum 540 corresponding to the tip of the cutting member 710, 720 is provided with an interference avoiding recess 540b, 540c. The cutting member 710, 720 is configured to be pressed against the separator 30 only for cutting, and is not caused to contact the vacuum suction conveyance drum 540. The cutting dust 30c generated due to the cutting process of the separator 30 may be adhered to the interference avoiding recess 540b, 540c, for example. Here, the cut dust 30c is chips such as of the heat-resistant material 32, which are produced when the separator 30 is cut out.

As shown in FIG. 9, after the cutting member 710, 720 has been retracted and separated away from the separator 30, the suction member 730 comes to contact the separator 30. The suction member 730 is formed in an elongated shape so as to correspond in size to the cutting member 710, 720. The suction member 730 includes a suction unit 730a, a support portion 730b which is connected the suction unit 730a at one end of the suction unit 730a, and a rotating portion 730c for rotatably holding the other end of the support portion 730b.

The suction unit 730a of the suction member 730 is provided with a first suction unit 731 and second suction units 732,733.

Through first suction opening 731a of the first suction unit 731, suction is possible by the suction mechanism 735 including a vacuum pump or the like shown in FIG. 7. The second suction units 732, 733 (i.e., the second suction unit 732 and the third suction unit 733) are provided in a pair and are disposed so as to sandwich the first suction unit 731, and contact respective end portion 30a of the cut out separators 30. The second suction units 732, 733 of the suction unit 730a are similarly sucked up by the suction mechanism 735 through second suction openings 732a, 733a.

As shown in FIG. 10, the first suction unit 731 of the suction member 730 moves in a direction away from the separator 30 by the driving mechanism 734 while sucking cut piece or particles 30b. The second suction units 732 and 734 of the suction member 730 respectively come into contact with an end portion 30a of the separator 30 to suck cutting dust in an exposed state due to removal of the cut piece 30b.

A collecting member 740 is disposed in proximity to the vacuum suction conveyance drum 540. The collecting member 740 collects cut piece 30b being sucked by the first suction unit 731 by sucking into the recovery hole 740a. In doing so, the first suction unit 731 of the suction member 730 stops the suction of the cut piece 30b. The collecting member 740 will discharge cut piece 30b thus collected to the waste container (not shown) or the like.

As has been described with reference to FIGS. 6 to 10, the separator cutting apparatus 700 allows to move the cut piece 30b of the cut out separator 30 by the first suction unit 731 in a direction away from the separator 30 while maintaining contact of the second suction units 732, 733 with end portions 30a of the cut out separators 30. Cutting dust exposed due to removal of the cut piece 30b will be sucked effectively.

Therefore, by a simple structure, cutting dust may be effectively removed in addition to cut piece 30b of the cut out separator 30. Further, even when the separator should be insufficiently cut out by the cutting member 710, 720, the second suction units 732, 733 are in contact with end portions 30a of the cut out separators 30. Thus, when the separator 30 is sucked by the first suction unit 731 of the suction member 730, cut piece 30b may be separated with ease.

The other separator 30 of the pair separators 30 is held by winding into a roll around the separator winding roller 610. A melt material 31 of the other separator 30 is in contact with a side of axis of the separator winding roller 610. The separator winding roller 610 is formed in a cylindrical shape and allowed to rotate in clockwise direction following the rotation of the vacuum suction conveyance drum 640 representing the conveying apparatus. The other separator 30 is conveyed with a constant tension imposed and sandwiched between the pressure roller 620 and the nip roller 630, and is further caused to rotate in a clockwise in a state of being vacuum sucked around the vacuum suction conveyance drum 640. The vacuum suction conveyer drum 640 is formed in a cylindrical shape with a plurality of suction ports.

The cutting apparatus 800 is intended to cut the other separator 30 of the pair separators 30. The separator cutting apparatus is constructed similarly to the structure of the separator cutting apparatus 700 for cutting the one separator described above.

The one separator 30, the positive electrode 10, and the other separator 30 are conveyed in a laminated state such that the pair of the separators 30 sandwich the positive electrode 10 in a gap created between the vacuum suction conveyance drums 540, 640.

The heating press member 910 is respectively disposed above and below both ends of the pair of separators 30 in the longitudinal direction thereof and is configured to sandwich the pair of the separators 30 and subsequently move up or down to separate from each other. The pair of separators 30 sandwiching the positive electrode 10 are joined or welded to form a pouched electrode 50. The pair of the separators 30 is disposed such that the respective heat-resistant member 32 comes to face each other. The heating press member 910 is made of stainless steel or copper, for example, and formed in a cuboid shape. The heating press member 910 is driven to move up and down by a drive unit not shown. The heating press member 910 will be heated by a heat wire or a heating bulb.

A plurality of the heating press members 910 sandwich both ends of the pair of the separators 30 in the longitudinal direction thereof from the vertical direction to join the pair of the separators 30. At this time, the pair of the separators 30 are held heated and pressurized by the heating press member 910. The heating press member 710 is adjusted to a temperature at which the melt material 31 of the pair of the separators 30 is caused to melt while preventing the heat-resistant material 32 from being melt. Thus, due to the melt material 31 subject to melting by the heating press member 910 being pressurized, the pair of the separators 30 is joined together. Subsequently, the plurality of the heating press members 910 will be separated from the joined pair of the separators 30. In the separator welding method described above, the pair of separators 30 sandwiching the positive electrode 10 are subject to heat and pressure by the heating press member 910 to weld the paired separators 30. The welding process of a pair of separators 30 corresponds to a process for forming so-called pouched electrode 50 which is excellent in terms of productivity and quality.

A bagged or pouched electrode suction pad 1010 places a completed pouched electrode 50 temporarily on a mounting table 1050. The pouched electrode suction pad 1010 is plate-shaped and provided with a plurality of suction ports in the surface which is in contact with the pouched electrode 50. The pouched electrode suction pad 1010 is coupled to an end of a telescopic part 1020, which is telescopically extendable by power of the air compressor or the like, for example (not shown). The other end of the telescopic part 1020 is coupled to a plate-shaped support member 1030. The support member 1030 reciprocates along a pair of rails by a rotation motor (not shown), for example. As described, the pouched electrode suction pad 1010 moves the pouched electrode 50 while sucking the same by the telescopic part 1020, support member 1030, and the pair of rails 1040, which has been conveyed by the suction conveyor 310 to place on the mounting table 850.

According to the cutting method of a separator 30 of an electrical device 1, or according to the separator cutting apparatus 700, 800 implementing the cutting method, the following effects may be obtained.

A cutting apparatus 700 such as for a separator of an electrical device 1 is configured to cut a separator 30 that includes a melt material 31 representing a substrate and a heat-resistant material 32 laminated on the melt material 31 and higher in melting point than the melt material 31. The separator cutting apparatus 700 comprises at least two cutting members 710,720 disposed spaced apart from each other, a first suction unit or section 731, and a second suction unit or section 732, 733. The cutting member 710,720 is configured to cut the separator 30 with a cut piece 30 being produced. The first suction unit 731 sucks the cut piece 30b to move in a direction away from the separator 30. The second suction unit 732, 733 sucks cutting dust generated due to cutting process of the separator 30.

With this structure, a cut piece or cut-out fragment is caused to be produced by at least two cutting members 710, 720 placed spaced apart from each other, the cut piece is moved while being sucked by the first suction unit 731 in a direction away from the separator 30, and cutting dust is sucked by the second suction units 732, 733. Therefore, it is possible to remove cutting dust 30c sufficiently in addition to the cut piece 30b of the separator 30 which has been cut out.

In other words, in a state in which, by separating a cut piece 30b from the separator 30, the cutting surface of the separator 30 is exposed, it is possible to remove the cutting dust 30c. In particular, when the cutting member 710, 720 is pressed on the side of the melt material 31 of the separator 30 and the separator 30 is cut out, the heat-resistant material 32 which would produce cutting dust is disposed on the backside. Even in this case, by separating the cut piece 30b from the separator 30, cutting dust 30c may be removed efficiently. In addition, even when cutting dust is adhered to the interference avoiding recess 540b, 540c of the vacuum suction conveyance drum 540, by separating the cut-out fragment or piece 30b from the separator 30, the interference avoiding recess 540b, 540c will be exposed so that cutting dust 30c may be eliminated effectively.

Further, in the first embodiment, the second suction unit 732, 733 may be constituted in pair so as to sandwich the first suction unit 731.

With this structure, in a state in which the cut piece 30b is separated from the separator 30 by the first suction unit 731, and the cut piece 30b is sandwiched in a space between the pair of the second suction units 732,733, cutting dust 30c which is exposed from the ends of the cutting surface of the separators 30 may be effectively sucked.

Further, in the first embodiment, the tip of the second suction unit 732, 733 is configured to contact the separator 30.

With this configuration, the pair of the second suction unit 732, 733 abut on the end portions 30a of the separators 30 which have been cut, the air tightness of the space between the separator 30 and the suction member 730 is improved and suction force is maintained. Thus, it is easy to suck the cutting dust 30c that is sandwiched in the space between the pair of the second suction units 732, 733.

Furthermore, with this structure, even when the cutting of the separator 30 by the cutting member 710, 720 is insufficient, the pair of second suction units 732, 733 is in contact with the end portions 30a of the separators 30. Thus, the cut piece 30b may be easily separated at the boundary of the end portion 30a.

Moreover, in the first embodiment, the heat-resistant material of the separator 30 subject to cutting process may be configured to include a powder applied to the melt material 31 and subsequently dried.

With this configuration, especially when the heat-resistant material 32 contains powder which is easily scattered, the powder may be sucked efficiently.

Furthermore, in the first embodiment, the powder may be ceramic powder. With this configuration, especially in the case of ceramics formed of inorganic compound at high temperature and powder is easily scattered, the ceramic dust 30c may be sucked efficiently.

Second Embodiment

Figure 11:
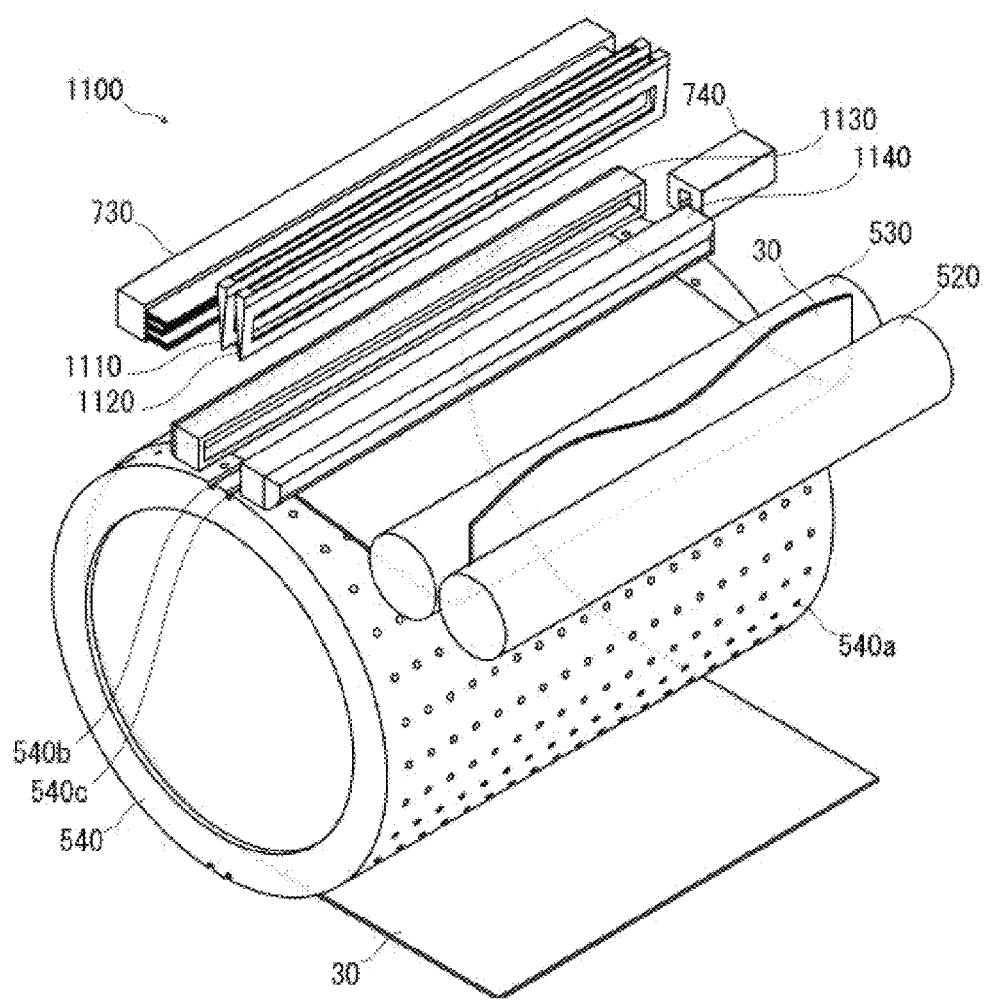
FIG. 11 is a view showing the vicinity of the separator cutting apparatus pertaining to a second embodiment.
Figure 12:
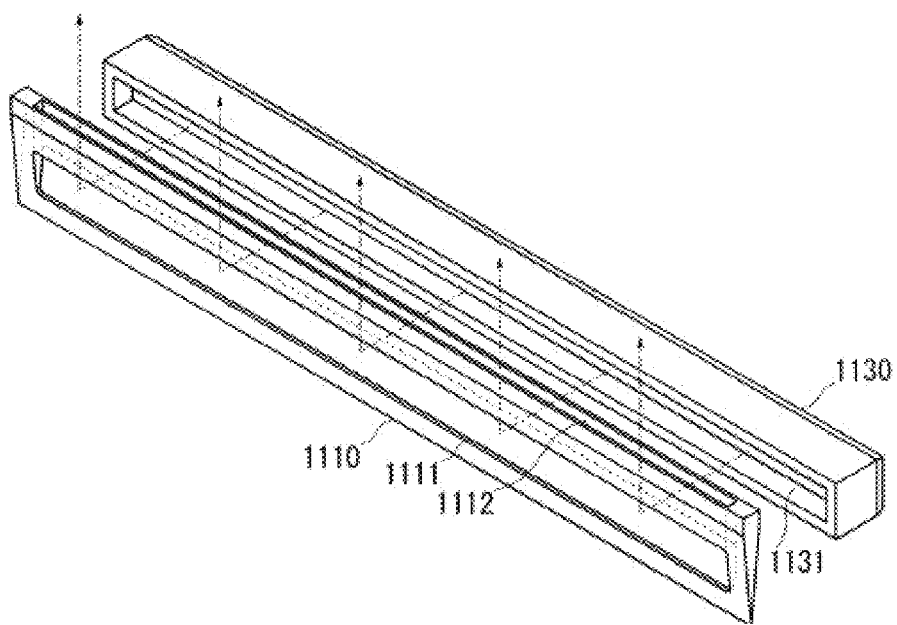
FIG. 12 is a perspective view showing a main portion of the separator cutting apparatus pertaining to the second embodiment.

Description is give of a cutting method of a separator 30 of an electric device 1 pertaining to a second embodiment, and a separator cutting apparatus 1100 carrying out the cutting method, with reference to FIGS. 11 and 12.

The separator cutting apparatus 1100 is differently structured from the separator cutting apparatus 700 pertaining to the first embodiment discussed above in that a hollow cutting member 1110 and the like is provided for enabling suction of cutting dust 30c and a blower unit 1130 is provided to supply air to the cutting member 1110 and the like.

In the second embodiment, with respect to elements similar to those in the first embodiment, the same reference numerals are used and a specific description will be omitted.

FIG. 11 is a view showing the vicinity of the separator cutting apparatus. FIG. 12 is a perspective view showing a main portion of the separator cutting apparatus. In FIG. 12, the distance between the cutting member 1110 and the blower unit 1130 is exaggerated and lengthened.

The cutting member 1110 is formed into a hollow shape that communicates between a side surface portion 1111 and a base portion 1112 facing a cutting edge.

The cutting member 1110 is similar in structure to the cutting member in the first embodiment except for the described shape. Cutting dust 30c produced due to cutting process of the separator 30 is sucked from the side surface portion 1111 of the cutting member 1110 to the base portion 1112. In FIGS. 11 and 12, the suction path of cutting dust 30c is shown by a dashed line in cutting member 1110. The side surface portion 1111 of the cutting member 1110 penetrates through the other side surface opposing the one side surface. However, the structure is not limited thereto. For example, such a structure is also acceptable in which only one side surface facing the blower unit 1130 described below is open, while the other side surface opposing the one side surface is closed. The cutting member 1120 has the same structure as the cutting member 1110.

The blowing member 1130 is provided adjacent the side surface portion 1111 of the cutting member 1110. The blowing member 1130 is formed in a rectangular shape along the cutting member 1110 and a plurality of fans and the like is disposed in parallel to each other in the interior thereof. The blowing member 1130 blows air in the direction toward the side surface portion of the cutting member 110, and guides the scattered cutting dust 30c to the cutting member 110. The blowing member 1140 is provided for sending air to the cutting member 1120 and structured similar to the blowing member 1130.

According to the cutting method for cutting a separator 30 of an electrical device 1 and a separator cutting apparatus implementing the cutting method, in addition to the effects attributable to the first embodiment, the following effects are further obtained.

In the second embodiment, the cutting member 1110 for example is formed in a hollow shape communicative between a side surface portion 1111 and a base portion 1112 opposing a blade end so that cutting dust 30c generated by cutting process of the separator 30 may be sucked through the side surface portion 1111 to the side of the base portion 1112.

With this structure, when cutting the separator 30, before cutting dust 30c which has been produced and scattered between the separator 30 and the cutting member 1110 is adhered to the surrounding parts, the cutting dust 30c may be sucked via the hollow portion of the cutting member 1110.

In addition, in the second embodiment, it may be further configured such that a blowing member 1130, for example, is disposed adjacent the cutting member 1110 for directing air flow in a direction toward the side surface portion 1111 of the cutting member 1110.

With this structure, scattered cutting dust 30c may be induced to the cutting member 1110 provided with the suction function. Thus, the cutting dust 30c may be sucked more efficiently.

In addition, the present invention is capable of various modifications on the basis of the configuration described in CLAIMS defining the scope of the present invention and the equivalents.

Specifically, in the separator cutting apparatus 700, the suction member 730 is not limited to be configured to include the second suction units or sections 732, 733. Either one of the second suction units 732, 733 may be included. The suction member is thus equipped with only one of the second suction units. Further, the cutting member is not limited to provide a pair of cutting members 710, 720. Instead, a single cutting member may be configured with a pair of cutting blades. Moreover, in the suction member 730, for example, cutting dust 30c is sucked by the second suction units 732, 733 while the cut piece 30b is being sucked by the first suction unit 731. However, the configuration is not limited thereto. More specifically, for example, the operation may be stopped after the cut piece 30b has been sucked by the first suction unit 731, and the cutting dust 30b will be sucked by the second suction units 732, 733. Also, the configuration is not limited to the suction process of cutting dust 30c continuously by the second suction units 732, 733. Instead, cutting dust 30 c may be sucked intermittently. Furthermore, the configuration is not limited to a separate provision of the collecting member 740. Rather, the suction member 730 may be provided with collecting mechanism for cut piece 30b and cutting dust 30c.

The invention claimed is:

1. A cutting apparatus for a separator of an electrical device, the separator including a melt material representing a substrate and a heat-resistant material laminated on the melt material and higher in melting point than the melt material, the cutting apparatus comprising:
    at least two cutting members disposed spaced apart from each other for cutting the separator into a cut piece with opposing cut edges, the at least two cutting members moved to the separator and away from the separator with a moving device; and
    a suction member comprising:
        a suction producing mechanism;
        a first suction unit providing a first suction opening that is configured to suck the cut piece with the first suction opening;
        a second suction unit providing a second suction opening that is configured to suck through the second suction opening cutting dust that is produced proximate the opposing cut edges of the cut piece;
        a rotating portion configured to move the first suction opening and the second suction opening into contact with the cut piece after the at least two cutting members are moved away from the separator; and
        a driving mechanism configured to move the first suction unit away from the separator to move the cut piece away from the separator while leaving the second suction unit in contact with the cut piece.

2. The separator cutting apparatus for an electrical device as claimed in claim 1, wherein the suction member further comprises a third suction unit with the first suction unit provided between the second suction unit and the third suction unit so as to sandwich the first suction unit, the second suction unit and the third suction unit spaced to correspond to the opposing cut edges of the cut piece.

3. The separator cutting apparatus for an electrical device as claimed in claim 1, wherein each of the at least two cutting members is formed with an aperture in a side surface portion thereof and a hollow base portion thereof opposing a blade end and opened to the aperture.

4. The separator cutting apparatus for an electrical device as claimed in claim 3, further comprising a blowing member disposed adjacent each of the at least two cutting members for blowing air in a direction of the side surface portion of a respective cutting member so that cutting dust may be blown through the aperture in the side surface portion and into the hollow base portion.

* * * * *